(12) United States Patent
Tezuka et al.

(10) Patent No.: US 7,819,055 B2
(45) Date of Patent: Oct. 26, 2010

(54) THREE-DIMENSIONAL PRINTER

(75) Inventors: Chikao Tezuka, Tomi (JP); Kazutomo Seki, Tomi (JP); Nobuyuki Ono, Nagano (JP)

(73) Assignees: Mimaki Engineering Co., Ltd., Nagano (JP); Institute of National Colleges of Technology, Japan, Tokyo (JP)

( * ) Notice: Subject to any disclaimer, the term of this patent is extended or adjusted under 35 U.S.C. 154(b) by 710 days.

(21) Appl. No.: 11/738,803

(22) Filed: Apr. 23, 2007

(65) Prior Publication Data

US 2008/0105144 A1 May 8, 2008

(30) Foreign Application Priority Data

Nov. 6, 2006 (JP) ............................. 2006-300520

(51) Int. Cl.
*B41F 17/08* (2006.01)

(52) U.S. Cl. ........................................ 101/38.1; 101/35

(58) Field of Classification Search ................... 347/1, 347/2, 4, 8, 14; 101/35, 36, 37, 38.1, 39, 101/40, 40.1, 485, 486
See application file for complete search history.

(56) References Cited

U.S. PATENT DOCUMENTS

| | | | | |
|---|---|---|---|---|
| 4,254,706 A | * | 3/1981 | Lala | ........................... 101/38.1 |
| 5,144,330 A | * | 9/1992 | Bennett | ......................... 347/2 |
| 6,050,182 A | * | 4/2000 | Arsenault et al. | .......... 101/38.1 |
| 6,811,648 B1 | * | 11/2004 | Dominico | ................... 156/277 |
| 6,817,287 B2 | * | 11/2004 | Shadrach, III | ................ 101/35 |
| 6,948,425 B2 | * | 9/2005 | Dumenil | ..................... 101/38.1 |
| 7,740,349 B2 | * | 6/2010 | Tezuka et al. | ................ 347/101 |
| 2001/0019340 A1 | | 9/2001 | Kubo et al. | |

FOREIGN PATENT DOCUMENTS

| | | |
|---|---|---|
| JP | 11-223705 | 8/1999 |
| JP | 2000-6493 | 1/2000 |
| JP | 2001-191514 | 7/2001 |
| JP | 2003-191455 | 7/2003 |
| JP | 2004-148666 | 5/2004 |

* cited by examiner

*Primary Examiner*—Ren Yan
(74) *Attorney, Agent, or Firm*—Ditthavong Mori & Steiner, P.C.

(57) ABSTRACT

A three-dimensional printer comprises a base 1, a first supporting member 10 supported on the base such that the first supporting member is movable in the direction of an axis X, a second supporting member 15 supported on the first supporting member such that the second supporting member is movable in the direction of an axis Z, a third supporting member 20 supported on the second supporting member such that the third supporting member is rotatable about a first rotation axis Y0 extending in the direction of an axis Y, a holding chuck 26, for holding a print substrate, supported on the third supporting member such that the holding chuck is rotatable about a second rotation axis X0, and a printer head 5 supported on the base 1 to extend above the print substrate 80 such that the printer head is movable in the direction of the axis Y. The movement and rotation of the first through third supporting members and the holding chuck are controlled by a movement controller and the movement of the printer head 5 is also controlled by the movement controller. The ejection of ink from the printer head 5 is controlled by a printing controller according to the movement and rotation control by the movement controller.

14 Claims, 4 Drawing Sheets

THREE-DIMENSIONAL PRINTER

TECHNICAL FIELD

The present invention relates to a three-dimensional printer in which ink is ejected from a printer head thereof to a print substrate having a three-dimensional surface so as to perform predetermined printing on the surface.

BACKGROUND ARTS

A various printers for printing characters, figures, and the like on a print substrate such as paper are conventionally known. As an example, a printer connected to a computer to perform a printing on a paper has been widely used for business purposes and household purposes. Typical conventional printer is of a style of printing while moving a paper or a sheet member as a print substrate in a predetermined feeding direction and moving a printer head thereof in a scanning direction perpendicular to the feeding direction. Examples include printers disclosed in JP-A-2003-191455 and JP-A-2004-148666.

The conventional printers are of a type of performing predetermined printing on a planate sheet member or a flat surface of a solid object, that is, of a type for performing two-dimensional printing. Recently, however, there is a need for a printer capable of performing a printing on an object having a three-dimensional surface (for example, a cylindrical surface, a spherical surface, and other various curved surfaces).

SUMMARY OF THE INVENTION

The present invention was made in the light of the above described problems and the object of the present invention is to provide a three-dimensional printer in which ink is ejected from a printer head thereof to a print substrate having a three-dimensional surface, such as a cylindrical surface, a spherical surface, and other various curved surfaces, so as to perform desired printing on the three-dimensional surface.

A printer according to the first invention is a three-dimensional printer in which ink is ejected from a printer head thereof to a print substrate having a three-dimensional surface so as to perform predetermined printing on the three-dimensional surface and comprises: a holding device for holding said print substrate; a supporting device for supporting said holding device and said printer head such that said holding device and said printer head are movable relative to each other in directions of axes X, Y, and Z which are perpendicular to each other, and for supporting said holding device such that said holding device is rotatable about the axis X and rotatable about the axis Y relative to said printer head; a movement controller for controlling said holding device and said printer head which are supported by said supporting device to move relative to each other in the directions of the axes X, Y, and Z and for controlling said holding device to rotate about the axis X and about the axis Y relative to said printer head; and a printing controller for controlling the ejection of ink from said printer head according to the movement and rotation control by said movement controller.

A printer according to the second invention is also a three-dimensional printer in which ink is ejected from a printer head thereof to a print substrate having a three-dimensional surface so as to perform predetermined printing on the three-dimensional surface and comprises: a base member; a first supporting member supported on said base member such that said first supporting member is movable in the direction of an axis X extending in a horizontal plane direction; a second supporting member supported on said first supporting member such that said second supporting member is movable in the direction of an axis Z extending in a vertical direction perpendicular to said horizontal plane direction; a third supporting member supported on said second supporting member such that said third supporting member is rotatable about a first rotation axis extending in the direction of an axis Y perpendicular to the directions of the axes X and Z; a holding device, for holding a print substrate, supported on said third supporting member such that the holding device is rotatable about a second rotation axis extending in a plane perpendicular to the first rotation axis; and a printer head disposed on said base member to extend above the print substrate, held by said holding device, such that said printer head is movable in the direction of the axis Y; a movement controller for controlling the movement and rotation of said first through third supporting members and said holding device and for controlling the movement of said printer head; and a printing controller for controlling the ejection of ink from said printer head according to the movement and rotation control by said movement controller.

It is preferable that said first rotation axis and said second rotation axis cross each other because this arrangement facilitates the operation control.

According to the printer of the first invention having the aforementioned structure, the holding device and the printer head are controlled by the movement controller to move relative to each other in the directions of the axes X, Y, and Z and the holding device is controlled by the movement controller to rotate about the axis X and about the axis Y, whereby the printer head can be moved to achieve a predetermined positional relation to have a predetermined space relative to the print substrate (that is, to achieve a suitable space and suitable positional relation for performing printing by depositing ink ejected from the printer head to a surface of the print substrate). During the relative movement, the ejection of ink from the printer head is controlled by the printing controller according to the relative movement, thereby easily and automatically performing desired printing on the three-dimensional surface of the print substrate.

Similarly, according to the printer of the second invention, the movement of the first supporting member in the direction of the axis X on the base member, the movement of the second supporting member in the direction of the axis Z relative to the first supporting member, the rotation of the third supporting member about the first rotation axis relative to the second supporting member, the rotation of the holding device about the second rotation axis relative to the third supporting member, and the movement of the printer head in the direction of the axis Y on the base member are controlled by the movement controller, whereby the printer head can be always moved relative to the three-dimensional surface of the print substrate, held by the holding device, to achieve suitable space and suitable positional relation for performing printing. During the relative movement, the ejection of ink from the printer head is controlled by the printing controller according to the relative movement, thereby easily and automatically performing desired printing on the three-dimensional surface of the print substrate.

DESCRIPTION OF THE PREFERRED EMBODIMENTS

Figure 1:
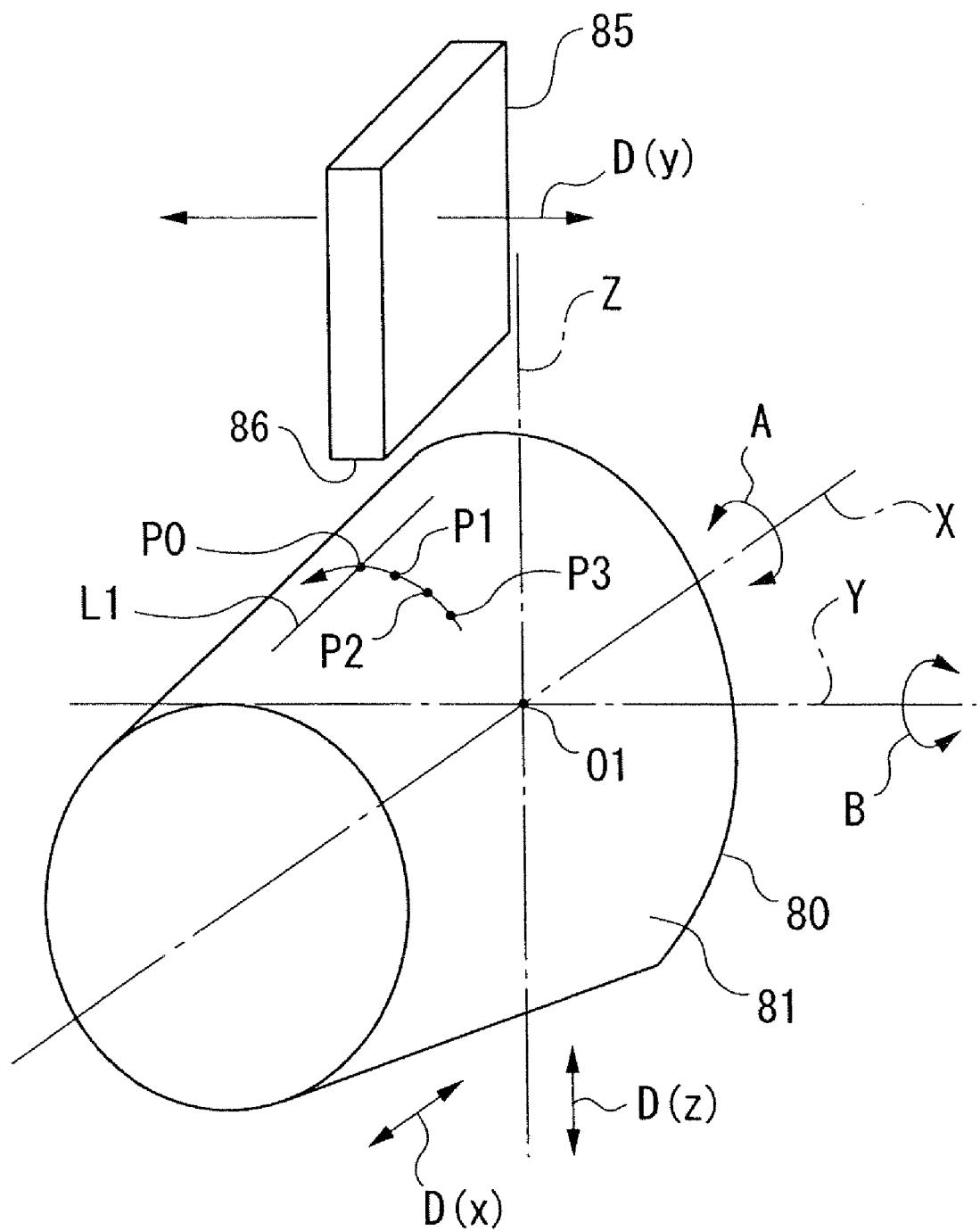
FIG. 1 is a schematic view for explaining the operation principle of a printer according to the present invention.

Hereinafter, description will be made as regard to preferred embodiments of the present invention with reference to drawings. First, control of relative movement between a print substrate 80 held by a holding device and a printer head 85 and control of printing in the printer of the present invention will be briefly described with reference to FIG. 1. The print substrate 80 in FIG. 1 is a member having a truncated cone shape. Ink is ejected from the printer head (inkjet head) 85 to an outer surface 81 of the truncated cone shape to perform desired printing on the surface. FIG. 1 will be used for describing the operation principle of the printer having the aforementioned arrangement.

The printer has a supporting device for supporting the print substrate 80, but not shown. The supporting device supports the print substrate 80 in such a manner that the central axis X of the print substrate 80 extends in an anteroposterior direction, the print substrate 80 is rotatable about the axis X (i.e. rotatable in the direction shown by an arrow A), in addition to this state, the print substrate 80 is rotatable about an axis Y extending in a lateral direction perpendicular to the axis X and passing through a point O1 on the axis X (i.e. rotatable in the direction shown by an arrow B), the print substrate 80 is movable anteroposteriorly along the axis X (i.e. movable in the direction shown by an arrow D(x)), and further the print substrate 80 is movable vertically along an axis Z extending in a vertical direction perpendicular to the axis X and the axis Y (i.e. movable in the direction shown by an arrow D(z)). The printer head is arranged above the print substrate 80 supported in the aforementioned manner by the supporting device (not shown) in such a manner that the printer head is movable in the directions of the axis Y (i.e. movable in the direction shown by an arrow D(y)). The printer head 85, which is provided with a plurality of ink nozzle holes formed in a bottom thereof, ejects ink supplied from an ink supplier (not shown) in a state that the ink nozzle holes are each controlled by a printing controller to perform predetermined printing on the surface 81 of the print substrate 80.

To perform the desired printing on the conical surface 81 of the print substrate 80, supported by the supporting device, by ejecting the ink through the ink nozzle holes formed in the bottom of the printer head 85, it is necessary to bring the ink nozzle holes close to the print substrate to have a predetermined printing distance from the printing location of the surface of the print substrate 80 (i.e. an optimum distance for the printing performed by depositing the ink ejected from the ink nozzle holes to the surface 81). It is also necessary to set the ink nozzle holes formed in the bottom of the printer head 85 such that the ink nozzle holes fully face the surface to be printed on, that is, the ejecting direction of the ink from the ink nozzle holes becomes perpendicular to the surface 81. For example, in case of ejecting ink from the printer head 85 to a point P0 in FIG. 1 on the surface of the print substrate 80 to perform the printing on the point P0, it is necessary to bring the surface at the point P0 (hereinafter, sometimes referred to as "print point") to a position where is spaced apart from the bottom 86 of the printer head 85 just by the predetermined printing distance and to make the surface at the point P0 parallel to the bottom 86 of the printer head.

For this, from the state that the print substrate 80 is supported as shown in FIG. 1, the print substrate 80 is moved anteroposteriorly along the direction of the axis X (i.e. moved in the direction shown by the arrow D(x)) until the print point P0 reaches a position directly below the printer head 85, the print substrate 80 is rotated about the axis X (i.e. rotated in the direction shown by the arrow A) until the print point P0 becomes the top of the print substrate 80, the print substrate 80 is rotated about the axis Y (i.e. rotated in the direction shown by the arrow B) until the ridge line L1 passing through the print point P0 extends horizontally, the printer head 85 is moved along the in the direction of the axis Y (i.e. moved in the direction shown by the arrow D(y)) until the bottom 86 (nozzles for ejecting ink) of the printer head 85 reaches to a position directly above the print point P0, and the print substrate 80 is moved along the direction of the axis Z (moved in the direction of the arrow D(z)) until the bottom 86 (nozzles for ejecting ink) of the printer head 85 becomes spaced apart from the print point P0 just by the predetermined printing distance. It should be noted that the moving and rotating order is not limited unless the print substrate 80 and the printer head 85 interfere each other.

In the state that the bottom 86 (nozzles for ejecting ink) of the printer head 85 is spaced apart from the print point P0 by the predetermined printing distance and is set to fully face the print point P0 in the aforementioned manner, ink is ejected from the nozzle holes of the bottom 86 of the printer head 85 according to the control by the printing controller so as to perform the printing on the point P0. To perform the printing on the surface of the print substrate 80 along the circumferential direction thereof for example, the ejection of ink controlled by the printing controller is conducted while the position of the print substrate 80 supported by the aforementioned supporting device is changed in such a manner as to set points P1, P2, P3, . . . along the circumferential direction on the outer surface of the print substrate 80 to fully face the bottom 86 of the printer head 85 with the predetermined printing distance therebetween in sequence.

A concrete example arrangement of a printer capable of performing the three-dimensional printing according to the operation principle as described above will be described with reference to FIG. 2 through FIG. 4. This printer has a base 1 and a gate-like supporting frame 2. The gate-like supporting frame 2 is fixed on the base 1 and comprises a pair of left and right supporting legs 2a, 2b and a supporting beam 2c connecting the upper ends of the supporting legs 2a, 2b and extending in a lateral direction. The printer also has a first controller 6 with an operator control panel 6a which is adjacent to the right supporting leg 2b and a second controller 7 with a maintenance station 8 which is adjacent to the left supporting leg 2a. The first and second controllers 6, 7 comprise various controllers such as a movement controller for controlling the movement and rotation of the respective components as will be described later, a printing controller for controlling the ejection of ink from the printer head, and a power controller.

A pair of front and rear lateral guide rails 3a, 3b extending in the lateral direction (direction of the axis Y) on the upper surface of the supporting beam 2c and a printer head carriage 4 is mounted on the lateral guide rails 3a, 3b such that the printer head carriage 4 is movable in the lateral direction (i.e. movable in the direction shown by arrow D(y)). To allow the movement of the printer head carriage 4 in the lateral direction, a traveling mechanism such as a ball screw mechanism is provided. By controlling the driving of the traveling mechanism, the lateral movement of the printer head carriage 4 can be controlled. Since such traveling mechanism is well known in the art, the description of the structure will be omitted.

The printer head carriage 4 is a member which extends forward from a portion supported by the lateral guide rails 3a, 3b, is bent downward, and extends forward again, that is the printer head carriage 4 has a crank shape as seen from a side. Mounted on a front end portion 4a of the printer head carriage 4 is a plurality of printer head modules 5. The printer head modules 5, also called inkjet head modules, are each provided with a number of ink nozzle holes formed in the bottom thereof and, for example, eject respective inks of different colors from the ink nozzle holes. The control of ink ejection is conducted by the printing controller for every ink nozzle hole. Since such control is conventionally well known in the art, the description of the structure will be omitted. In the specification, the printer head module 5 itself or the printer head carriage 4 with the printer head modules 5 corresponds to "the printer head" defined in claims of the present invention.

Figure 2:
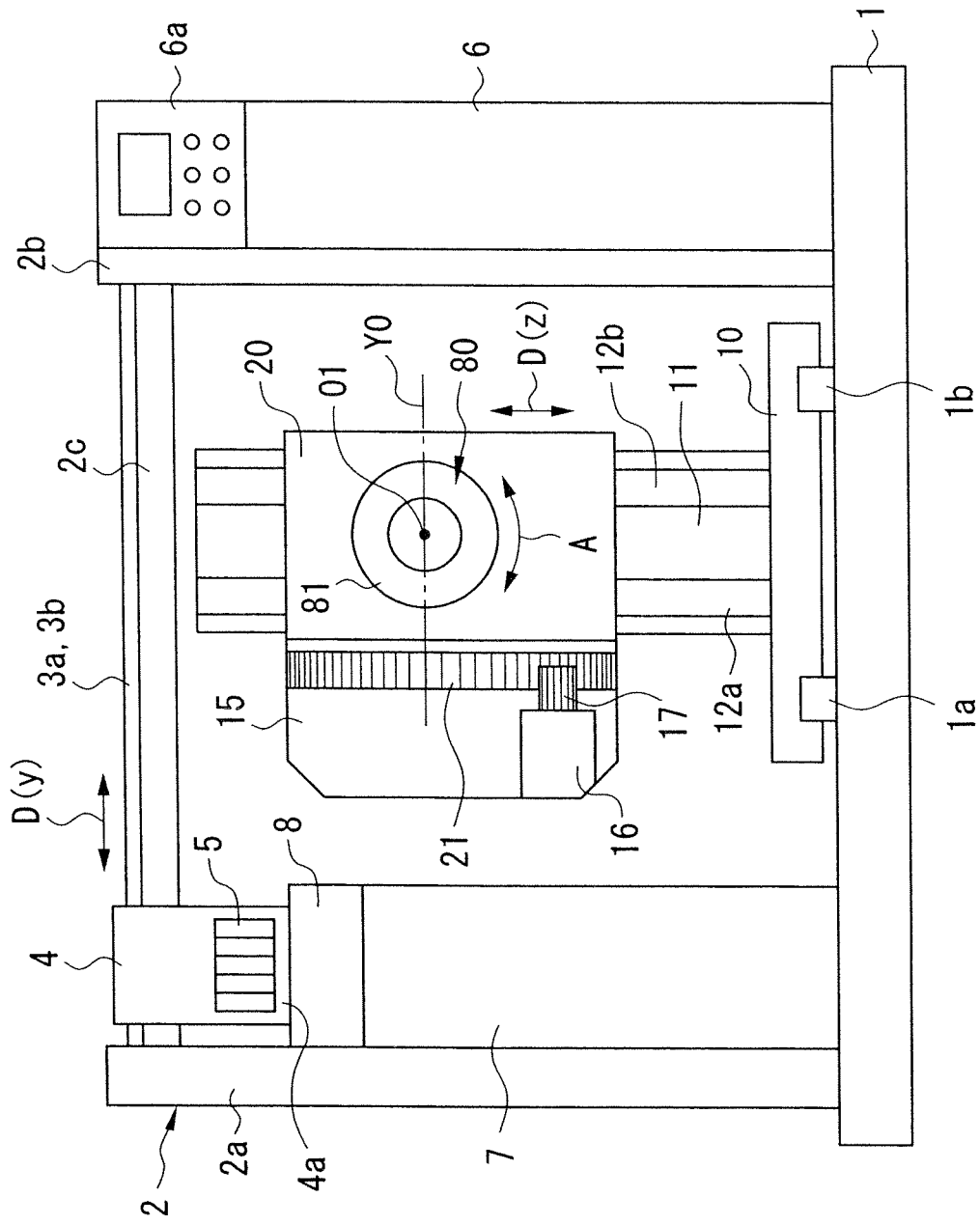
FIG. 2 is a front view of a printer according to an embodiment of the present invention.

The printer head carriage 4 with the printer head modules 5 is movable along the lateral guide rails 3a, 3b in the lateral direction. In a state that the printer head carriage 4 is at the leftmost position as shown in FIG. 2, the maintenance station 8 is moved upward to prevent the ink nozzle holes in the bottoms of the printer head modules 5 from being dried and to clean the ink nozzle holes.

A pair of anteroposterior guide rails 1a, 1b extending in the anteroposterior direction (direction of the axis X) are arranged on the base 1 between the left and right supporting legs 2a, 2b of the gate-like supporting frame 2. A first supporting member 10 is mounted such that the first supporting member 10 is movable along the anteroposterior guide rails 1a, 1b in the anteroposterior direction (i.e. movable in the direction shown by the arrow D(x)). To allow the movement of the first supporting member 10 in the anteroposterior direction, a traveling mechanism such as a ball screw mechanism is provided. By controlling the driving of the traveling mechanism, the anteroposterior movement of the first supporting member 10 can be controlled. Since such traveling mechanism is well known in the art, the description of the structure will be omitted.

A vertical supporting member 11 is fixed in a vertically standing state on the first supporting member 10. Attached to the front surface of the vertical supporting member 11 are a pair of vertical guide rails 12a, 12b extending in the vertical direction (the direction of the axis Z). A second supporting member 15 is mounted to and supported by the vertical guide rails 12a, 12b such that the second supporting member 15 is movable in the vertical direction (i.e. movable in the direction shown by the arrow D(z)). To allow the movement of the second supporting member 15 in the vertical direction, a traveling mechanism such as a ball screw mechanism is provided. By controlling the driving of the traveling mechanism, the vertical movement of the second supporting member 15 can be controlled. Since such traveling mechanism is well known in the art, the description of the structure will be omitted.

The front surface 15a of the second supporting member 15 is formed into a semicircular shape of which center is a first rotation axis Y0 extending in the direction of the axis Y passing through a prescribed point O1 (a point set to a position where the print substrate 80 will be positioned as will be described later) defined relative to the second supporting member 15. A third supporting member 20 has a rear surface 20a having a semicircular shape corresponding to the semicircular shape of the front surface 15a. The third supporting member 20 is disposed slidably along the front surface 15a. That is, the rear surface 20a of the third supporting member 20 is movable and slidable relative to the front surface 15a of the second supporting member 15, thereby allowing the third supporting member 20 to rotate about the first rotation axis Y0 relative to the second supporting member 15 (i.e. rotate in the direction shown by the arrow B). The third supporting member 20 is supported by the second supporting member 15 in the aforementioned manner.

To move the third supporting member 20 to rotate about the first rotation axis Y0 relative to the second supporting member 15, the third supporting member 20 is provided with internal teeth 21 which are formed in a front surface of a left-side portion, in FIG. 2, thereof and of which center is the first rotation axis Y0. A driving motor 16 is mounted on a front surface of a left-side portion of the second supporting member 15 and is provided with a driving pinion 17 attached to a driving shaft thereof. The driving pinion 17 is meshed with the internal teeth 21. As the driving pinion 17 is driven to rotate by the driving motor 16, the internal teeth 21 meshed with the driving pinion 17 are driven to rotate, thereby rotating the third supporting member 20 about the first rotation axis Y0.

A holding shaft 25 extends in the anteroposterior direction (the direction of the axis X) and projects forward from the front surface of the third supporting member 20 in such a manner that the holding shaft 25 is rotatable about a second rotation axis X0 passing through the aforementioned prescribed point O1. A holding chuck 26 for holding the print substrate is attached to the front end of the holding shaft 25. The holding shaft 25 is driven to rotate by a driving motor (not shown) which is disposed within the third supporting member 20 and the holding chuck 26 has a structure capable of holding the print substrate 80. As the holding shaft 25 is driven to rotate with the print substrate 80 held by the holding chuck 26, the print substrate 80 is rotated about the second rotation axis X0.

The holding shaft 25 and the holding chuck 26 compose the holding device defined by claims. The second rotation axis X0 extends in the anteroposterior direction (the direction of the axis X) when the third supporting member 20 is positioned at a predetermined rotational position (the rotational position shown in FIG. 3). Since the third supporting member 20 is rotatable about the first rotation axis Y0 as mentioned above, the second rotational axis X0 is inclined upward or downward according to the rotational position of the third supporting member 20. Though the first rotation axis Y0 and the second rotation axis X0 both pass the prescribed point O1 and cross each other in the illustrated example, these may not cross each other, that is, may be shifted from each other. However, the first rotation axis Y0 and the second rotation axis X0 preferably cross each other because the position calculation of the print substrate 80 is facilitated and the control by the movement controller is facilitated.

In the printer having the aforementioned structure, the second rotation axis X0 as the rotation center of the holding shaft 25 corresponds to the axis X in the arrangement for explaining the operation principle shown in FIG. 1 and the first rotation axis Y0 as the rotation center of the third supporting member 20 corresponds to the axis Y in the arrangement for explaining the operation principle shown in FIG. 1. The second supporting member 15 supporting the third supporting member 20 is supported by the first supporting member 10 in such a manner as to allow the second supporting member 15 to move in the direction of the axis Z (the vertical direction) (i.e. to move in the direction shown by the arrow D(z)) and the first supporting member 10 is supported on the base 1 in such a manner as to allow the first supporting member 10 to move in the direction of the axis X (the anteroposterior direction) (i.e. to move in the direction shown by the arrow D(x)). In addition, the printer head is supported above the print substrate 80 in such a manner as to allow the printer head to move in the direction of the axis Y (the lateral direction) relative to the base 1 (i.e. to move in the direction shown by the allow D(y)). That is, the printer is adapted to perform the same actions as explained in the operation principle as shown in FIG. 1.

Figure 3:
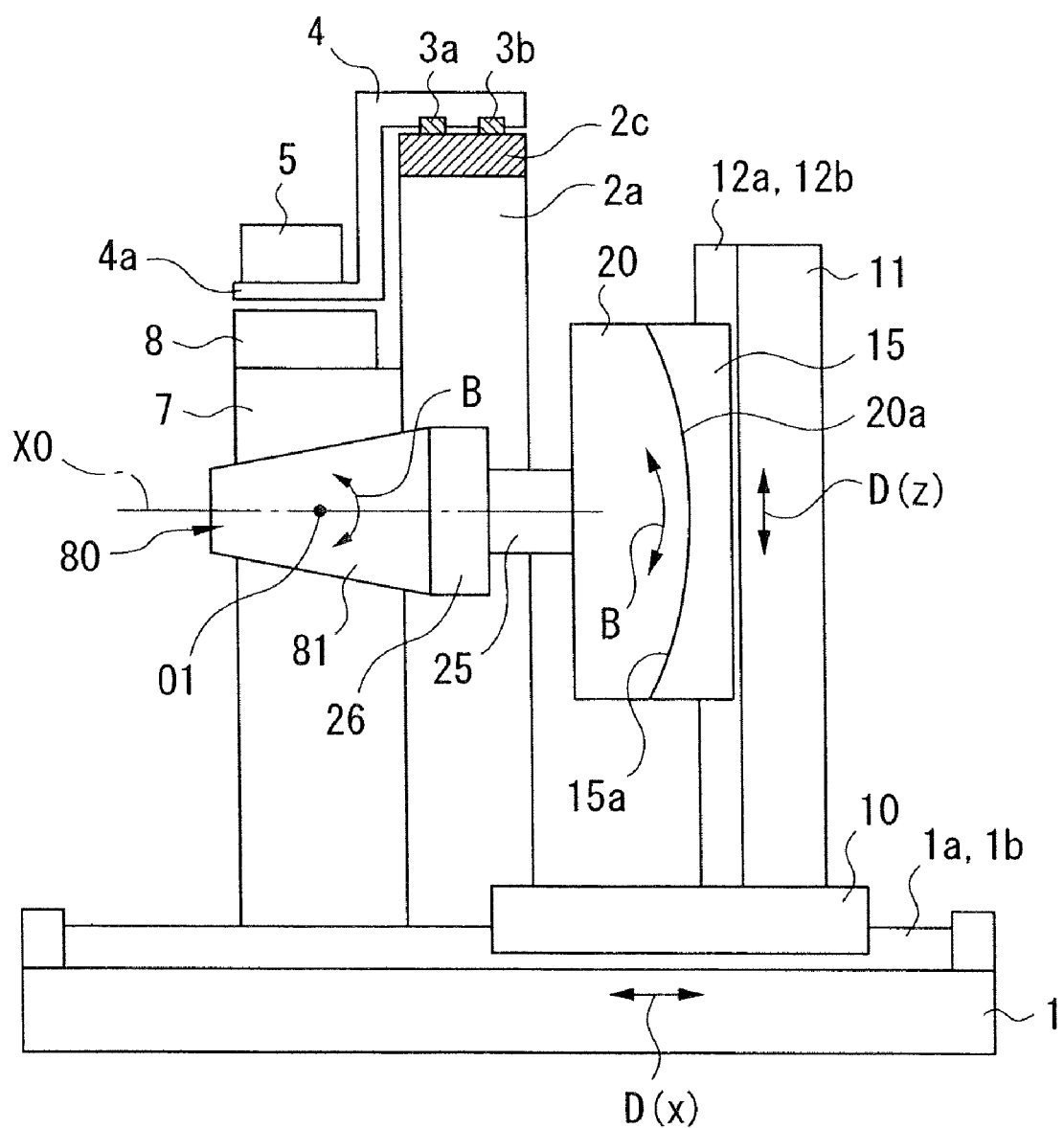
FIG. 3 is a side view of the printer.
Figure 4:
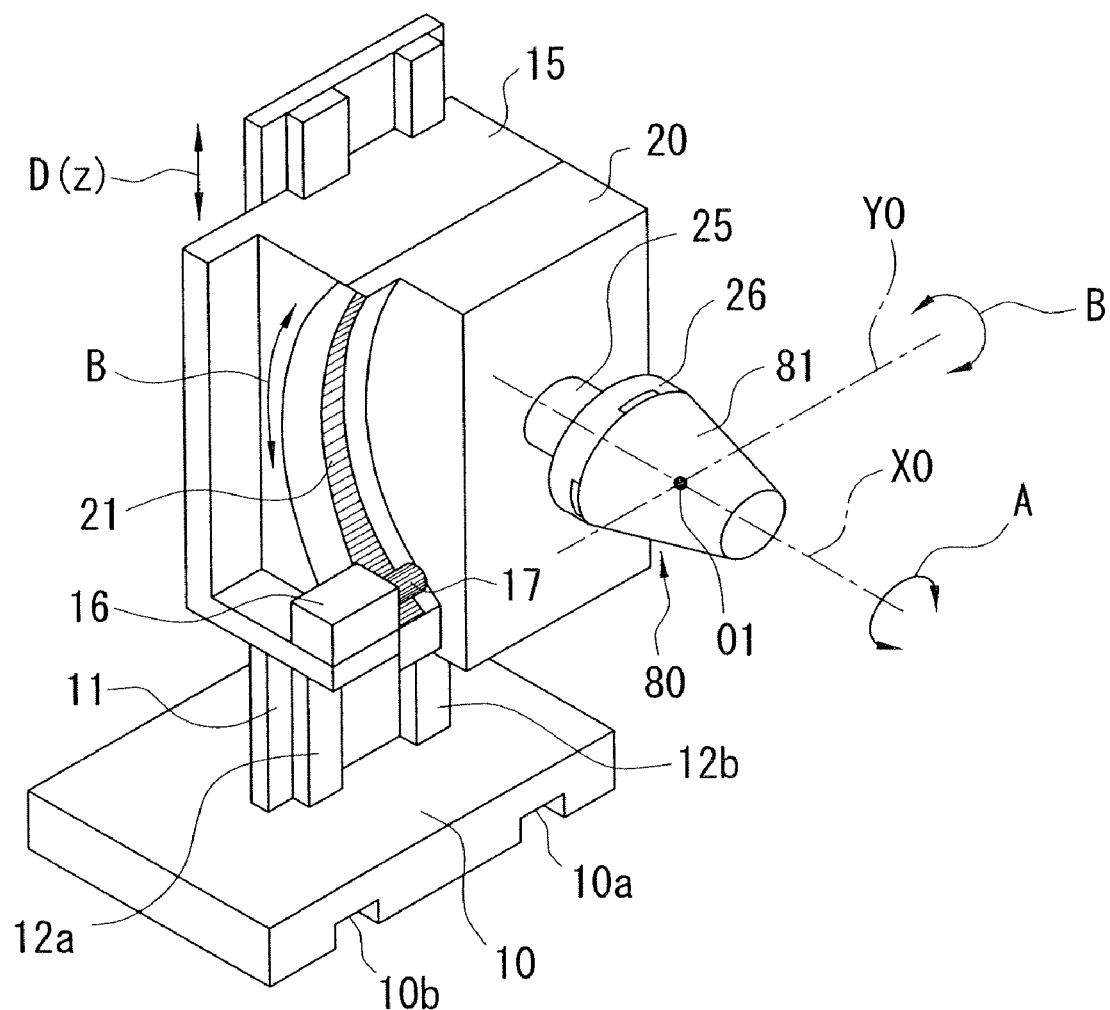
FIG. 4 is a perspective view showing a part of the printer.

As apparent from the above description, the printer as shown in FIG. 2 through FIG. 4 can perform the desired printing by ejecting ink from the ink nozzle holes formed in the bottom of the printer head modules 5 onto the surface 81 of the print substrate 80 according to the operation principle explained with reference to FIG. 1. Though an example in which the printing is performed on the surface of the print substrate 80 having a truncated cone shape is explained with reference to FIG. 1, the configuration of the print substrate is not limited thereto and the printing can be performed on any curved surface including a cylindrical surface and a spherical surface.

What is claimed is:

1. A three-dimensional printer comprising:
   a base member;
   a first supporting member supported on said base member such that said first supporting member is movable in the direction of an axis X (an anteroposterior direction) extending in a horizontal plane direction;
   a second supporting member supported on said first supporting member such that said second supporting member is movable in the direction of an axis Z (a vertical direction) extending in a direction perpendicular to said horizontal plane direction;
   a third supporting member supported on said second supporting member such that said third supporting member is rotatable about a first rotation axis extending in the direction of an axis Y perpendicular to the directions of the axes X and Z;
   a holding device, for holding a print substrate, supported on said third supporting member such that the holding device is rotatable about a second rotation axis extending in a plane perpendicular to the first rotation axis;
   a printer head disposed on said base member to extend above the print substrate, held by said holding device, such that said printer head is movable in the direction of the axis Y (a lateral direction);
   a movement controller for controlling the movement and rotation of said first through third supporting members and said holding device and for controlling the movement of said printer head; and
   a printing controller for controlling the ejection of ink from said printer head according to the movement and rotation control by said movement controller.

2. A three-dimensional printer as claimed in claim 1, wherein said first rotation axis and said second rotation axis cross each other.

3. A three-dimensional printer as claimed in claim 1, wherein a gate-like supporting frame is fixed on said base member and comprises a pair of left and right supporting legs and a supporting beam connecting the upper ends of the supporting legs and extending in a lateral direction, a lateral guide rail is arranged on said supporting beam to extend in the direction of the axis Y, and said printer head is supported on said lateral guide rail such that said printer head is movable in a lateral direction.

4. A three-dimensional printer as claimed in claim 3, wherein said printer head is moved on said lateral guide rail by a traveling mechanism comprising a ball screw mechanism.

5. A three-dimensional printer as claimed in claim 3, wherein said movement controller and said printing controller are arranged adjacent to said left and right supporting legs.

6. A three-dimensional printer as claimed in claim 3, wherein said printer head comprises a printer head carriage supported by said lateral guide rail and a printer head module attached to said printer head carriage, and the ejection of ink from ink nozzle holes formed in the bottom of said printer head module to a surface of said print substrate is controlled by said printing controller.

7. A three-dimensional printer as claimed in claim 3, wherein an anteroposterior guide rail extending in the direction of said axis X is disposed on said base member between said left and right supporting legs of said gate-like supporting frame and said first supporting member is disposed on said anteroposterior guide rail such that said first supporting member is movable in the direction of axis X.

8. A three-dimensional printer as claimed in claim 7, wherein said first supporting member is moved on said anteroposterior guide rail by a traveling mechanism comprising a ball screw mechanism.

9. A three-dimensional printer as claimed in claim 1, wherein a vertical supporting member is fixed in a vertically standing state on the first supporting member, a vertical guide rail extending in the direction of the axis Z is attached to said vertical supporting member, and said second supporting member is supported by said vertical guide rail such that said second supporting member is movable in the direction of said axis Z.

10. A three-dimensional printer as claimed in claim 9, wherein said vertical guide rails are moved by a traveling mechanism comprising a ball screw mechanism.

11. A three-dimensional printer as claimed in claim 1, wherein the front surface of said second supporting member is formed into a semicircular shape the center of which is a first rotation axis Y0 extending in the direction of said axis Y passing through a prescribed point O1 defined relative to the second supporting member, a third supporting member having a rear surface having a semicircular shape corresponding to the semicircular shape of the front surface is disposed slidably along said front surface, and said third supporting member is supported such that said third supporting member is rotatable about said first rotation axis Y0 relative to said second supporting member.

12. A three-dimensional printer as claimed in claim 11, wherein said third supporting member is provided with internal teeth which are formed in a front surface of a side portion thereof and the center of which is said first rotation axis Y0, a driving motor is mounted on a front surface of a left-side portion of the second supporting member, a driving pinion attached to a driving shaft of said driving motor is meshed with said internal teeth, and said third supporting member is rotated about said first rotation axis Y0 by said driving pinion which is driven to rotate by said driving motor.

13. A three-dimensional printer as claimed in claim 11, wherein a holding shaft extends in the direction of said axis X and projects forward from the front surface of the third supporting member such that the holding shaft is rotatable about a second rotation axis X0, and said holding device for holding said print substrate is attached to the front end of said holding shaft.

14. A three-dimensional printer as claimed in claim 13, wherein said holding device is driven to rotate by a driving motor which is disposed within said third supporting member and thus rotates said print substrate about said second rotation axis X0.

* * * * *